(12) United States Patent
Englander et al.

(10) Patent No.: US 12,270,692 B2
(45) Date of Patent: Apr. 8, 2025

(54) OPTICAL FLUID FLOW VELOCITY MEASUREMENT

(71) Applicant: Flowlit Ltd., Haifa (IL)

(72) Inventors: Abraham Englander, Rehovot (IL); Tuvia Segal, Haifa (IL)

(73) Assignee: Flow-Lit Ltd., Rehovot (IL)

( * ) Notice: Subject to any disclaimer, the term of this patent is extended or adjusted under 35 U.S.C. 154(b) by 889 days.

(21) Appl. No.: 17/435,771

(22) PCT Filed: Jan. 24, 2020

(86) PCT No.: PCT/IB2020/050557
§ 371 (c)(1),
(2) Date: Sep. 2, 2021

(87) PCT Pub. No.: WO2020/178641
PCT Pub. Date: Sep. 10, 2020

(65) Prior Publication Data
US 2022/0155116 A1      May 19, 2022

Related U.S. Application Data

(60) Provisional application No. 62/814,927, filed on Mar. 7, 2019.

(51) Int. Cl.
*G01F 1/661* (2022.01)
*G01F 1/66* (2022.01)

(52) U.S. Cl.
CPC .............. *G01F 1/661* (2013.01); *G01F 1/662* (2013.01)

(58) Field of Classification Search
None
See application file for complete search history.

(56) References Cited

U.S. PATENT DOCUMENTS 5,701,172 A * 12/1997 Azzazy ................... G01P 5/26
356/28
6,378,357 B1 * 4/2002 Han ....................... G01F 1/663
73/64.53

(Continued)

FOREIGN PATENT DOCUMENTS

EP    0311176 A1 * 9/1988 ............. G01F 1/704
EP    0311176         4/1989

(Continued)

OTHER PUBLICATIONS

PIV Handbook, vol. 2, English translation from Japanese, ca. 2014.

(Continued)

*Primary Examiner* — Luke D Ratcliffe
(74) *Attorney, Agent, or Firm* — Dekel Patent Ltd.; David Klein

(57) ABSTRACT

A method of fluid flow velocity measurement includes emitting a beam from a light source via a first window into a pipe through which a fluid flows, the beam illuminating the fluid flowing in the pipe, using a light detector array, which is coupled via a second window to the pipe and which is outside a field of view of the light detector, to detect light caused by scattering of the beam with particles found in the fluid, and determining a velocity of the fluid flowing in the pipe as a function of signals from the light detector array.

14 Claims, 1 Drawing Sheet

(56) References Cited

U.S. PATENT DOCUMENTS

| | | | | |
|---|---|---|---|---|
| 7,265,832 | B2* | 9/2007 | Montgomery | G01F 1/661 250/222.2 |
| 2010/0235117 | A1* | 9/2010 | Melnyk | G01P 5/22 356/28 |
| 2010/0313674 | A1* | 12/2010 | Dutel | G01F 1/7086 356/338 |
| 2016/0312553 | A1* | 10/2016 | Zhao | G01F 1/661 |
| 2016/0320219 | A1* | 11/2016 | Hellevang | G01N 29/22 |

FOREIGN PATENT DOCUMENTS

| | | |
|---|---|---|
| JP | 1989114720 | 5/1989 |
| JP | 2004333237 | 11/2004 |

OTHER PUBLICATIONS

PCT Search Report and Written Opinion PCT/IB2020/050557, May 29, 2020.

Hocevar et al., "Prediction of the grey level intensity in selected windows of image sequence using radial basis network", ISIE'2000. Proceedings of the 2000 IEEE International Symposium on Industrial Electronics, Dec. 4, 2000.

Filippo Colletti et al., "Flow field investigation in rotating rib-roughened channel by means of particle image velocimetry", Sep. 6, 2011, Experiments in Fluids 52(4):1043-1061.

Afshin Goharzadeh et al., "Measurement of fluid velocity development in laminar pipe flow using laser Doppler velocimetry", Sep. 2013, European Journal of Physics 34(5):1127-1134.

Willert et al., "Recent applications of particle image velocimetry in aerodynamic research", Flow Measurement and Instrumentation, Sep. 1, 1996, pp. 247-256.

Kumara et al., "Particle image velocimetry for characterizing the flow structure of oil-water flow in horizontal and slightly inclined pipes", Aug. 1, 2010, Chemical Engineering Science 65(15):4332-4349.

Lee Yong et al., "PIV-DCNN: cascaded deep convolutional neural networks for particle image velocimetry", Nov. 15, 2017 Experiments in Fluids 58(12).

* cited by examiner

OPTICAL FLUID FLOW VELOCITY MEASUREMENT

FIELD OF THE INVENTION

The present invention relates generally to fluid flow measurement and in particular to an optical fluid flow measurement assembly and method.

BACKGROUND OF THE INVENTION

Accurate measurement of liquid flow and gas is essential for process monitoring, control and custody transfer in many industries such as chemical, refining, water/wastewater, power, pharmaceutical, food and beverage. Many applications also require the ability to conduct in-line diagnostics and monitoring of the flowing medium to ensure adequate process conditions and product quality.

Current process-control instrumentation manufacturers offer various mechanical flow-measurement options such as:
  Coriolis—The liquid flows through a tube which is under vibration. The vibration produces an acceleration which in turn produces a measurable twisting force on the tube proportional to the mass of the liquid.
  Vortex—The flow will alternately generate vortices when passing by a blunt body. Flow velocity is proportional to the frequency of the vortices.
  Differential pressure—A constriction such as orifice plate or flow nozzle in the pipe creates a pressure drop across the flowmeter. The pressure drop across the constriction is proportional to the square of the flow rate
  Turbine—As liquid through a freely suspended turbine, it causes the blades to rotate. The velocity of the turbine rotor is directly proportional to the velocity of the fluid.

Generally, mechanical flow meters entail obstructions to be inserted inside the pipe, which disrupt the fluid flow and create pressure drops. Furthermore, many mechanical sensors require that high flow rates be attained to produce a measurable and accurate effect. This is problematic for some applications where the tank pressure is low, or when leaks in the pipe must be detected.

Other technologies to measure flow rates have been also used. Among them are ultrasonic flowmeters that use the Doppler effect in sound waves to determine the velocity of a fluid flowing in a pipe or magnetic flowmeters that are suitable for conducting liquids only. Some ultrasound meters need compartments in the pipe walls to contain the ultrasound sources as well as long pipe sections to accommodate the acoustic beams paths, which can be expensive for large pipe diameters. Other varieties of ultrasonic flow meters launch the acoustic waves through the wall of the pipe, using clamp-on transducers, but their accuracy at low flow rates is diminished. Optical, non-invasive, techniques for measuring the flow rate of fluids in pipes such as laser Doppler anemometry, particle tracking, image velocimetry or laser two-focus anemometry are also well known. These techniques have several common characteristics.

Generally, they require multiple beams and operate mostly in pulsed mode and require fast and precise electronics to synchronize between laser pulses and the recording devices. Although generally they provide accurate results, their use has been mostly limited to research environments and they are not considered suitable for industrial process monitoring due to their cost, complexity and sensitivity to vibration and misalignments.

A simpler optical method, namely the cross-correlation method is used to monitor the flow of gases in industrial environments, as described in U.S. Pat. No. 6,369,881.

An optical cross-correlation flow sensor for measuring gas velocity in pipes relies generally on an optical transmitter that generates a collimated optical beam across the gas flow and an optical receiver including a plurality of receiving lenses and optical photodetectors all located in optical communication with the optical transmitter and in the path of the optical beam and separated from each other in a direction perpendicular to the direction of gas flow.

Temporal cross-correlation calculations are performed on the signals obtained from the light detectors and the velocity of the gas is obtained by dividing the separation distance between the photodetectors by the time difference at which the same scintillation event is observed by each photodetector.

Instead of the cross-correlation method, time-of-flight methods can also be used to measure fluid velocity on the basis of the transit time of the particles passing between the two spots (as is shown, for example, in UK Patent 2295670).

The implementation however of the cross-correlation method or time-of-flight method in a configuration where the light source is disposed opposite the photodetectors is not well suited for measuring liquid flows in a pipe. The light beams crossing the gas flow are also scattered by the molecules of the flowing medium (Rayleigh scattering). This scattering causes a constant noise background but its contribution to the overall scattering signal intensity by particles flowing with gases may be generally neglected due to the low density of the gas molecules. This is not the case however if the light beam crosses a liquid medium. Since the density of molecules in a liquid is by several orders of magnitude larger than in gas, the Rayleigh scattering strength generated by the beam traversing the flow is comparable or larger than the Mie-scattering strength of the particles flowing with the liquid which causes a substantial deterioration in the cross-correlation or time-of-flight accuracy or may prevent altogether a cross-correlation or time-of-flight analysis.

Prior art optical fluid flow velocity measurement systems require a plurality of light beams or sheets. For example, in European Patent 0952431, any velocity measurement at a specific location requires at least two closely spaced sheets of light. In U.S. Pat. No. 6,700,652, a plurality of differently-colored light beams are required.

SUMMARY OF THE INVENTION

The object of the present invention is to provide a simple, robust and non-invasive optical method and apparatus for measuring the velocity of fluids, particularly particle-containing fluids, and in particular particle-containing liquids, flowing in a pipe, which mitigates significantly the Rayleigh scattering contribution of the fluid molecules to the detected signal and provides accurate results in a large range of flow values.

More specifically, the invention relates to an optical apparatus containing a single continuous wave light source placed outside the pipe such as a light emitting diode (LED) emitting a narrow pencil-like beam or a beam in the form of a light sheet which illuminates the flow through a window in the pipe and a multiplicity of light detectors such a two-dimensional CCD array disposed along the axis of the flow outside the pipe in such a way that the emitted beam does not impinge on the detector array. The intersection of the light beam with the field of view of the CCD array determines the measurement volume of the device. The scattered light by small particles passing through the beam in the measurement volume is collected by a collection lens that focuses the collected light onto the light detectors which record in a continuous manner the signal created by the collected light. The velocity of the flow is determined by analyzing the recorded time varying signal by mathematical methods such as the cross-correlation method or time-of-flight method or by machine-learning algorithms.

It is also an object of the invention to make available a fluid flow meter that can be inserted in a thin gap in a pipe and has an inner diameter that matches the pipe's inner diameter in which it is inserted, so as not to disrupt the flow within the pipe.

It is also an object of the invention to maximize the ratio between Mie and Rayleigh scattering. More specifically, the invention tends to maximize the Mie scattering of particulates in the flow and minimize the detection of Rayleigh scattered light from the liquid's molecules and minimize the detection of unscattered incident light by positioning the light detectors in such a way that there is no optical communication between the light source and the photodectors which is achieved by disposing the light source outside the field of view of the light detectors.

Another object is to make an optical apparatus available that can simultaneously with the velocity measurement, determine the density of the scattering particles in the flow by counting the amount of scattering particles and measuring the amount of scattered light and to correlate the amount of scattering particles and the amount of scattered light to the turbidity values of the flow.

Another object is to make an optical apparatus available that can warn when a change in the scattering values or statistical distribution is observed.

Yet another object of the invention to provide an optical system that can visualize the flow in a pipe and transmit in real-time a video of the flow inside the pipe.

To achieve these and other objects, there is provided an apparatus for measuring the velocity of small particles or bubbles carried by a fluid (liquid or gas) flowing through a pipe.

The present invention solves the deficiencies of the prior art by incorporating a very compact optical system design in an optical flow meter. The compact optical system design uses a single light source which illuminates a fluid (liquid or gas) flowing in a pipe through a window where the light source is located outside the field of view of light detectors positioned behind a separate window in the pipe. The detectors collect the light scattered by particles flowing with the fluid (e.g., liquid).

According to one embodiment, the optical system includes a light source that illuminates the flow by a beam in the form of a thin sheet and a two-dimensional array of CCD or CMOS detectors such as used in video cameras or in bar-code scanners.

There is thus provided in accordance with an embodiment of the invention a fluid flow velocity measurement system including a light source coupled via a first window to a pipe through which a fluid flows, the light source configured to emit a beam which illuminates the fluid flowing in the pipe, a light detector array coupled via a second window to the pipe, wherein the light source is outside a field of view of the light detector, the light detector array being configured to detect light caused by scattering of the beam with particles found in the fluid, and a processor configured to determine a velocity of the fluid flowing in the pipe as a function of signals from the light detector array.

In accordance with an embodiment of the invention the processor is configured to determine the velocity of the fluid flowing in the pipe by analysis of a time varying signal from the light detector array by a cross-correlation method or time-of-flight method or by a machine-learning algorithm.

In accordance with an embodiment of the invention a collection lens is configured to focus collected light onto the light detector array.

There is provided in accordance with an embodiment of the invention a method of fluid flow velocity measurement including emitting a beam from a light source via a first window into a pipe through which a fluid flows, the beam illuminating the fluid flowing in the pipe, using a light detector array, which is coupled via a second window to the pipe and which is outside a field of view of the light detector, to detect light caused by scattering of the beam with particles found in the fluid, and determining a velocity of the fluid flowing in the pipe as a function of signals from the light detector array.

BRIEF DESCRIPTION OF THE DRAWINGS

The present invention will be understood and appreciated more fully from the following detailed description, taken in conjunction with the drawings in which.

DETAILED DESCRIPTION

Figure 1:
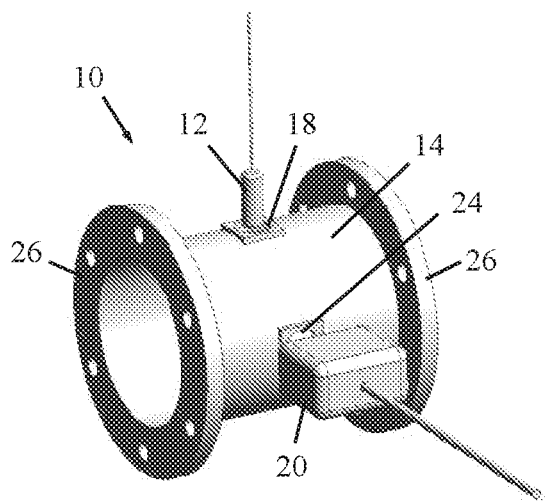
FIG. 1 is a simplified perspective illustration of an optical fluid flow velocity measurement system, constructed and operative in accordance with a non-limiting embodiment of the present invention.
Figure 3:
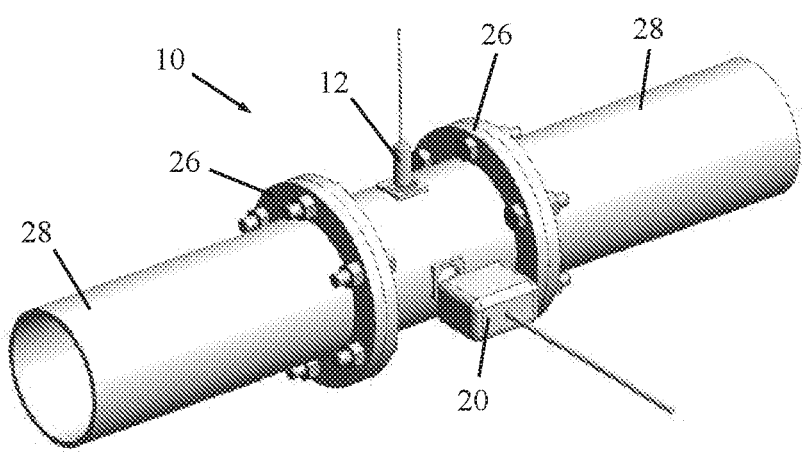
FIG. 3 is a simplified perspective illustration of the optical fluid flow velocity measurement system connected to other pipes.
Figure 4:
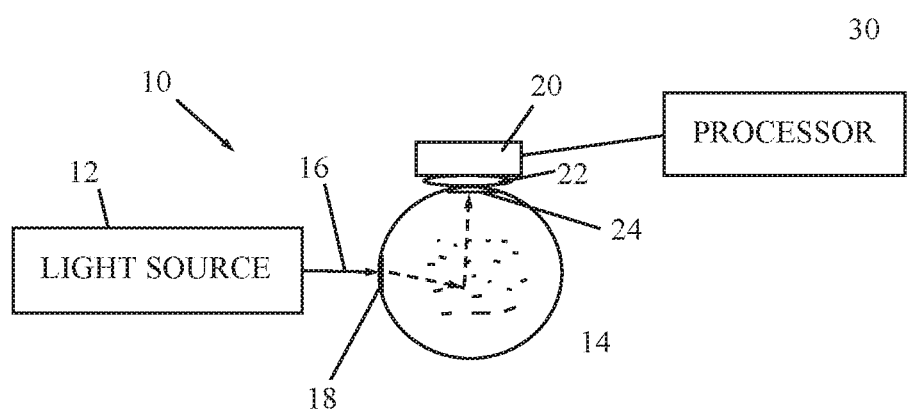
FIG. 4 is a simplified block diagram of the optical fluid flow velocity measurement system.

Reference is now made to FIGS. 1, 3 and 4, which illustrate an optical fluid flow velocity measurement system 10, in accordance with a non-limiting embodiment of the present invention.

Figure 2:
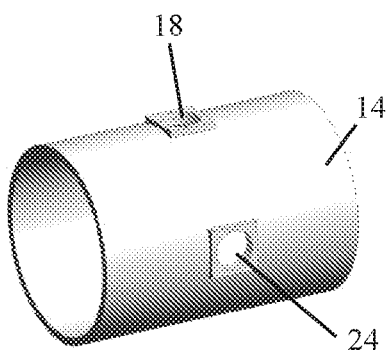
FIG. 2 is a simplified perspective illustration of a pipe with windows used in the optical fluid flow velocity measurement system.

System 10 includes a continuous wave light source 12 placed outside a pipe 14 through which the fluid flows. An example of light source 12 is a light emitting diode (LED) emitting a beam 16, such as a narrow pencil-like beam or a beam in the form of a light sheet, which illuminates the fluid flow through a window 18 (FIGS. 2 and 4) in the pipe 14. The window 18 may be an opening in the pipe 14 which is covered or sealed by a transparent covering; alternatively, the window 18 may be a transparent portion of the pipe 14 itself (pipe 14 may be either completely transparent or transparent in a local area to form the window 18 for the beam 16).

System 10 includes one or more light detectors 20, also called light detector array 20, such as but not limited to, a two-dimensional CCD array disposed along the axis of the flow outside the pipe 14 in such a way that the emitted beam 16 does not impinge on the detector array 20. Rather the emitted beam 16 is scattered by small particles passing through the beam. As opposed to the prior art, only a single light beam 16 is used in the measurement volume and yet surprisingly the single beam provides accurate measurements, thus significantly reducing size, cost and complexity. The scattered light in the measurement volume is collected by a collection lens 22 that focuses the collected light onto the light detectors 20 which record in a continuous manner the signal created by the collected light. The intersection of the light beam with the field of view of the detector array 20 determines the measurement volume of the device. The detector array 20 and lens 22 are mounted at another window 24 (FIGS. 2 and 4) in the pipe 14. Here again, window 24 may be an opening in the pipe 14 which is covered or sealed by a transparent covering; alternatively, window 24 may be a transparent portion of the pipe 14 itself (pipe 14 may be either completely transparent or transparent in a local area to form the window 24).

The pipe 14 may include one or more flanges 26 for connecting to fluid pipes 28, as seen in FIG. 3.

The velocity of the flow is determined by a processor 30 (FIG. 4) that analyzes the recorded time varying signal from detectors 20 by mathematical methods such as the cross-correlation method or time-of-flight method or by machine-learning algorithms.

The fluid flow meter 10 can be inserted in a thin gap in pipe 14 and has an inner diameter that matches the pipe's inner diameter in which it is inserted, so as not to disrupt the flow within the pipe.

The fluid flow meter 10 maximizes the ratio between Mie and Rayleigh scattering. More specifically, it maximizes the Mie scattering of particulates in the flow and minimize the detection of Rayleigh scattered light from the liquid's molecules and minimize the detection of unscattered incident light by positioning the light detectors 20 in such a way that there is no optical communication between the light source 12 and the photodetectors 20 which is achieved by disposing the light source 12 outside the field of view of the light detectors 20.

The optical apparatus 10 can simultaneously perform velocity measurement, determine the density of the scattering particles in the flow by counting the amount of scattering particles and measuring the amount of scattered light, and correlate the amount of scattering particles and the amount of scattered light to the turbidity values of the flow.

The optical apparatus 10 can warn when a change in the scattering values or statistical distribution is observed. The optical apparatus 10 can visualize the flow in pipe 14 and transmit in real-time a video of the flow inside the pipe 14.

What is claimed is:

1. A fluid flow velocity measurement system comprising:
   a light source coupled via a first window to a pipe through which a liquid flows, said light source configured to emit a beam which illuminates the liquid flowing in said pipe;
   a light detector array coupled via a second window to said pipe, wherein said light source is outside a field of view of said light detector to maximize Mie scattering of said particles found in and flowing with said liquid and minimize detection of Rayleigh scattered light from molecules of said liquid, said light detector array being configured to detect light caused by scattering of said beam with particles found in said liquid; and
   a processor configured to determine a velocity of the liquid flowing in said pipe as a function of signals from said light detector array.

2. The system according to claim 1, wherein said processor is configured to determine the velocity of the liquid flowing in said pipe by analysis of a time varying signal from said light detector array by a cross-correlation method or time-of-flight method or by a machine-learning algorithm.

3. The system according to claim 1, further comprising a collection lens configured to focus collected light onto said light detector array.

4. The system according to claim 1, wherein said light source comprises a continuous wave light source.

5. The system according to claim 1, wherein said first and second windows are transparent portions of said pipe.

6. A method of fluid flow velocity measurement comprising:
   emitting a beam from a light source via a first window into a pipe through which a liquid flows, said beam illuminating the liquid flowing in said pipe;
   using a light detector array, which is coupled via a second window to said pipe and which is outside a field of view of said light detector, to detect light caused by scattering of said beam with particles found in said liquid, to maximize Mie scattering of said particles found in and flowing with said liquid and minimize detection of Rayleigh scattered light from molecules of said liquid; and
   determining a velocity of the liquid flowing in said pipe as a function of signals from said light detector array.

7. The method according to claim 6, wherein determining the velocity of the liquid flowing in said pipe is done by analysis of a time varying signal from said light detector array by a cross-correlation method or time-of-flight method or by a machine-learning algorithm.

8. The method according to claim 6, further comprising using a collection lens to focus collected light onto said light detector array.

9. The method according to claim 6, wherein said light source comprises a continuous wave light source.

10. The method according to claim 6, wherein said first and second windows are transparent portions of said pipe.

11. The method according to claim 6, further comprising visualizing the flow in said pipe and transmitting in real-time a video of the flow inside said pipe.

12. The method according to claim 6, further comprising detecting a change in scattering values or a statistical distribution of the scattering of said beam with said particles.

13. The method according to claim 12, comprising warning when a change in the scattering values or statistical distribution is observed.

14. The method according to claim 6, further comprising simultaneously with the velocity measurement, determining a density of scattering particles in the flow by counting an amount of the scattering particles and measuring an amount of scattered light, and correlating the amount of the scattering particles and the amount of the scattered light to turbidity values of the flow.

* * * * *